United States Patent [19]

Wohlfeil

[11] 4,220,113

[45] Sep. 2, 1980

[54] DEVICE FOR APPLYING A COATING TO A MATERIAL WEB

[76] Inventor: Gerhard Wohlfeil, Habichtstrasse 7, 4019 Monheim, Fed. Rep. of Germany

[21] Appl. No.: 946,132

[22] Filed: Sep. 27, 1978

[30] Foreign Application Priority Data

Jun. 13, 1978 [DE] Fed. Rep. of Germany ....... 2825907

[51] Int. Cl.[2] ............................................. C03C 25/00

[52] U.S. Cl. .................................. 118/126; 15/256.51

[58] Field of Search ..................... 15/256.51; 118/100, 118/122, 123, 413, 419, 428, 126

[56] References Cited

U.S. PATENT DOCUMENTS 1,566,358 12/1925 White ................................ 15/256.51

3,187,718 6/1965 Coghill ................................ 118/126

3,229,662 1/1966 Means ................................ 15/256.51

3,611,841 10/1971 Froden et al. ........................ 118/123

*Primary Examiner*—J. Travis Brown

[57] ABSTRACT

A device for continuous application of coating of constant thickness to a web employing an elastic coating knife fixed in a clamping jaw and having a free edge parallel with a fixing line, the knife being prestressed against the web which is running over a roll, the knife center area being supported along a backup line, the clamping jaw being pivotable about the abutting line of the knife on the roll and about a line outside the fixing line in which the abutting and backup lines are fixed relative to the roll and the fixing line is continuously movable relative to the roll.

6 Claims, 5 Drawing Figures

DEVICE FOR APPLYING A COATING TO A MATERIAL WEB

BACKGROUND OF THE INVENTION

The present invention relates to a device for the continuous application of a coating of constant thickness to a material web, having an elastic coating knife, which is fixed on one side in a clamping jaw and on its free edge parallel to the fixing line is put under prestress against a material web being guided over a mating roll, with coating material applied at a sharp angle to the moving direction of said material web, and which at its center area is backed up along a supporting line, and where the clamping jaw is pivotable about the abutting line around the coating knife on the mating roll and around a line outside the fixing line.

Such form of device is known, e.g., in U.S. Pat. No. 3,187,718. With the device shown there, the clamping jaw is pivotable not only around the coating knife fixing line on the mating roll but around a line outside the fixing line. With the pivoting around the fixing line the angle of incidence of the unstressed coating knife, and with the pivoting around the line outside the fixing line, the prestress of the coating knife can be adjusted simultaneously with variations in the angle of incidence. A change in prestress and thus simultaneously in angular incidence is made possible also by a horizontal, linear shift of the clamping jaw. A precision setting of the coating knife is possible by varying the pressure in a hose trained on the supporting line.

On applying a coating of constant thickness to a material web by means of an elastic coating knife, the layer weight or stroke weight, i.e., the coating thickness is a function on the one hand of the prestress force, by which the coating knife is pressed against the mating roll, and on the other hand of the moving speed of the material web, the viscosity of a coating material, e.g., of a brushing-on color, and the geometric shape of the wedge gap between coating knife and material web, i.e., the coating knife angle of incidence. Of these magnitudes the coating knife prestress and angle of incidence can be varied in order to set the layer thickness. At an equilibrium between prestress force and hydrodynamic pressure force a specific distance between free coating knife edge and mating roll is produced, which determines the layer weight.

With the aforementioned device, variations in both coating knife angle of incidence and coating knife prestress are possible. Coating knife prestress settings rated at constant angle of incidence, i.e., constant geometric ratios between coating knife and mating roll, however, are neither possible nor intended.

SUMMARY OF THE INVENTION

The object of the invention is to produce a device of the above described type, which enables the user to vary the coating knife prestress for setting and/or servo-controlling the coating thickness without any change produced in the geometric ratios between coating knife and mating roll, i.e., in the angle of incidence.

This problem is solved according to the invention by arrangement of coating knife abutting, and supporting lines being unchanged under continual coating, operational conditions relative to the mating roll, and of a coating knife fixing line continually movable relative to the mating roll. Such a coating device development is particularly advantageous for low layer weights, where the hydrodynamic pressure force is to be kept at a maximally constant level.

On setting the device according to the invention, the coating knife first is pivoted into unstressed contact with the material web and/or the mating roll. Subsequently, the angle of incidence between coating knife and mating roll is adjusted to hydrodynamic pressure optimal ratios by pivoting the clamping jaw about the coating knife abutting line. The setting of the coating thickness and/or layer weight and also the operational control and/or servo control then takes place by shifting the coating knife fixing line relative to the mating roll with the coating knife configuration between abutting line and supporting line remaining unchanged.

Practicably the coating knife-fixing alignment with the clamping jaw is shiftable with linear guidance at an acute or sharp angle to a plane as determined by the unstressed coating knife. This insures that in the prestress setting area the coating knife does not change its configuration between abutting and supporting lines, while simultaneously a highly sensitive adjustment can be carried out.

For practical reasons said linear guidance is that of a brace-slot carried clamping jaw sliding guide. An advantageous way of shifting the clamping jaw is to provide for spindle-type elevating mechanisms and a geared motor. This results in a sensitive and reproducibly settable regulating unit for coating thickness control and servo control.

Expediently the supporting line backup in the coating knife central area is of a linear and rigid type. This contributes to keeping the coating knife configuration between abutting line and supporting line and thus the hydrodynamic pressure being rated at various coating knife prestress values against the back pressure roll at a constant level.

For the backup of the supporting line expediently a rigid comb ridge with linear abutment on the coating knife is provided, which is adjustable along the supporting line via draw-in bolts and pressure screws in the brace.

Finally for practical reasons the coating knife is so tapered according to the constant angle of incidence that a narrow obtuse-angular edge is maintained in the frontal area of the coating knife back. The result is that the coating knife edge does not have to be ground in first but is preground by the chamfer and frontally abuts on the material web and/or mating roll with a relatively broad surface. The purpose of the narrow blunt edge in the coating knife back area is, among others, to avoid injuries on installing the coating knife.

Particularly for high layer weights it may be of advantage to carry out—instead of a coating knife prestress control and servo control—a coating knife angle-of-incidence control and servo control. This, too, is possible with a device according to the invention by proceeding from the setting of a coating knife basic angle of incidence and basic prestress, where however, expediently a coating knife without chamfered edge is used.

BRIEF DESCRIPTION OF THE DRAWINGS

An exemplified embodiment of the invention is described below in more detail with reference to attached drawings wherein like reference numerals are used to denote like parts.

DESCRIPTION OF THE PREFERRED EMBODIMENTS

Figure 1:
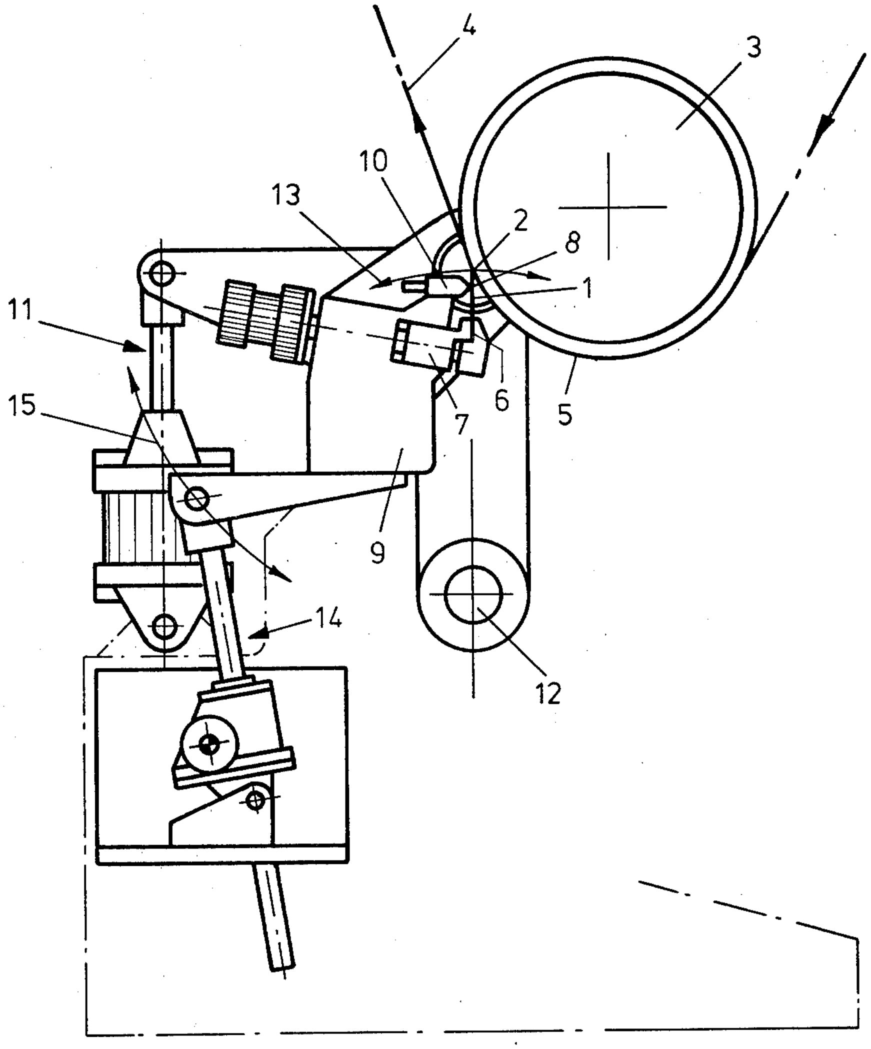
FIG. 1 shows a schematized lateral view of a coating device, whereby the applicator mechanism is omitted.

The coating device shown in FIG. 1 is equipped with a coating knife 1, which abuts on a material web 4 with excess applied coating material 5 being run over a mating roll 3 along an abutting line 2. Coating knife 1 is fixed in a clamping jaw 7 along a fixing line 6, and is supported along supporting line 8 by a comb ridge 10 seated in a brace 9. The materials of the coating device as described herein, in particular, the elastic coating knife 1, are of the type shown and described, for example, in U.S. Pat. Nos. 3,187,718 to Coghill and 3,079,889 to Jacob and Coghill.

Clamping jaw 7 is pivoted around axis 12 by means of a setting device 11 to the extent that coating knife 1 is pivoted away from mating roll 3 and pivoted back, i.e., pivotable in the directions of double arrow 13.

A further setting device 14 insures that clamping jaw 7 can be pivoted around abutting line 2 in the direction of double arrow 15. This pivoting serves the incidence-angular setting of coating knife 1 relative to mating roll 3.

Figure 2:
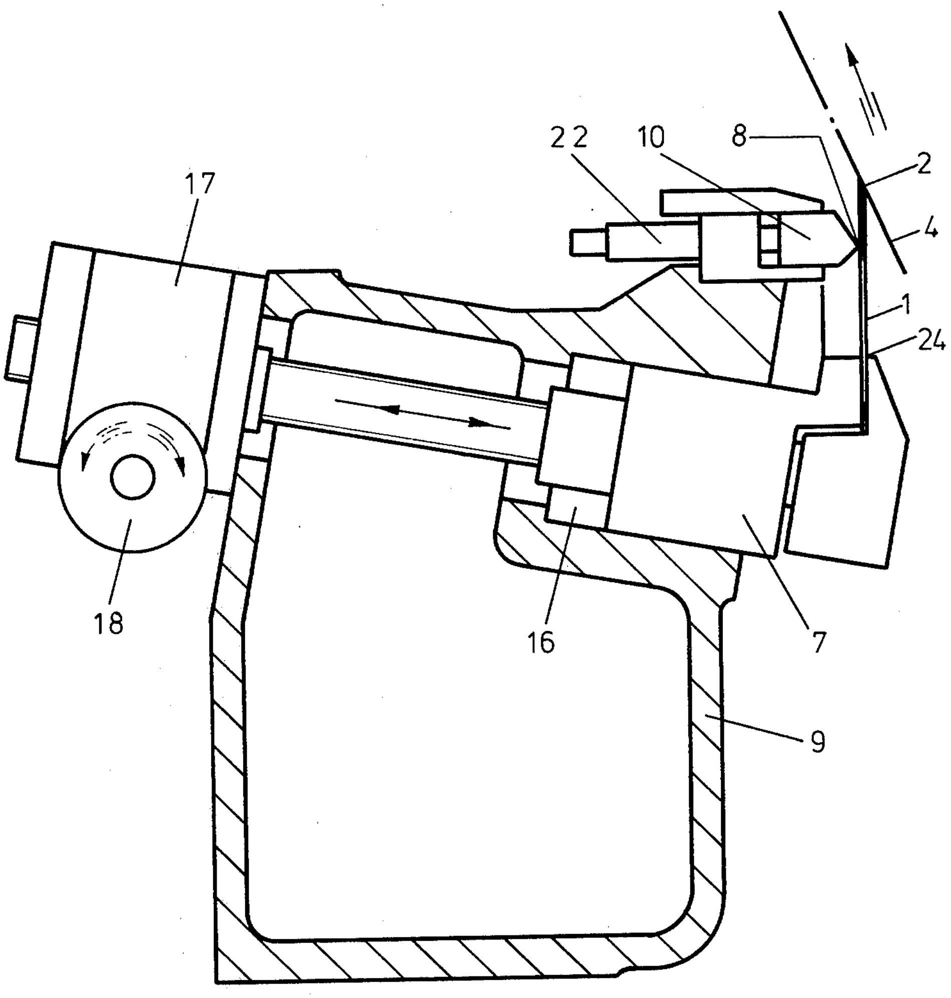
FIG. 2 a cutout from FIG. 1 drawn to an enlarged scale with an unstressed coating knife pivoted against the mating roll.
Figure 3:
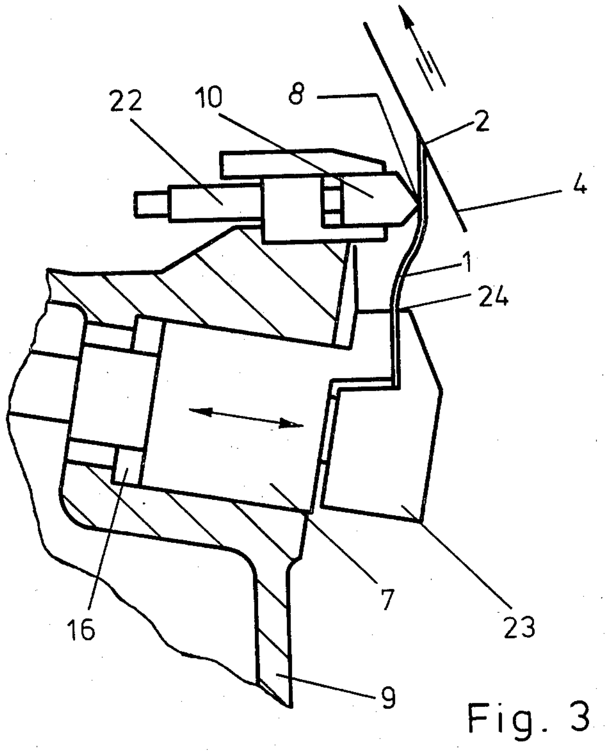
FIG. 3 a cutout according to FIG. 2 with prestressed coating knife.

FIGS. 1 and 2 show the coating knife 1 in an unstressed position abutting on material web 2 and/or mating roll 3. To be able to adjust the prestress of coating knife 1 at unchanged angular incidence thereof relative to mating roll 3 the clamping jaw 7 is carried slidingly to a slot 16 of brace 9. To shift clamping jaw 7 in slot 16, spindle-type elevating mechanisms 17 and a geared motor 18 are provided. FIG. 3 shows coating knife 1 in a prestressed position produced by actuating geared motor 18 without changing the angle of incidence and the geometric configuration of coating knife 1 between abutting line 2 and supporting line 8.

On setting the described coating device the coating knife 1 first is brought to an unstressed abutment on mating roll 3 along abutting line 2. Subsequently, the coating knife 1-angle of incidence relative to mating roll 3 is set by means of setting device 14. Finally, the prestress of coating knife 1 is set in above described way by means of geared motor 18. The prestress then is operationally servo-controlled and/or readjusted to a constant value for keeping the layer weight and/or coating thickness at a constant level. This operation is particularly suitable for low layer weights.

If so required, the coating thickness can be adjusted by proceeding from a coating knife basic angle of incidence and basic prestress also through operationally varying the angle of incidence via setting device 14, which is of advantage particularly with high layer weights.

Figure 4:
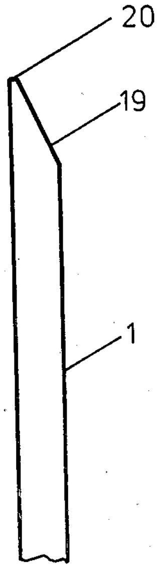
FIG. 4 the upper part of a coating knife with an edge chamfered according to the invention.

FIG. 4 shows the upper part of a coating knife 1, which is equipped with a polished section 19 set at an angle according to the coating knife 1-angle of incidence against mating roll 3. The chamfer or polished section 19 is so designed that a narrow blunt edge 20 is maintained in the frontal area of the coating knife back, this to avoid injuries on installing the coating knife. Said chamfering of coating knife 1 avoids a grind-in period on inserting a new coating knife, and the coating knife geometric ratios even in the area of abutting line 2 remain completely constant. However, if operationally the angle of incidence of coating knife 1 relative to mating roll 3 is to be varied, it is expedient to use a coating knife without a polished section 19.

Figure 5:
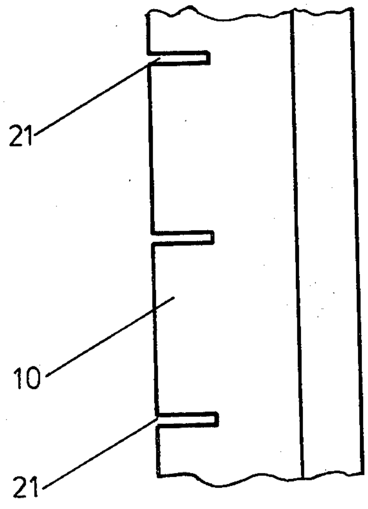
FIG. 5 a top-viewed cutout of a comb ridge.

FIG. 5 finally shows a detail in top view of comb ridge 10 with slots 21. Said comb ridge is rigid and so designed that it results in a linear and rigid backup of supporting line 8 in the central area of coating knife 1. Rigid comb ridge 10 is adjustable in brace 9 via draw-in bolts and pressure screws 22 (see FIGS. 2 and 3). Together with this arrangement of coating knife 1-supporting line 8 the latter's linear backup substantially contributes to maintaining the geometric configuration of coating knife 1 between supporting line 8 and abutting line 2 independent from the prestress of said coating knife 1. The latter along its fixing line 24 is rigidly locked with clamping jaw 7 by means of clamp rail 23.

The position of clamping jaw 7 relative to brace 9 and thus the prestress of coating knife 1 can be digitally indicated in a simple way on the control console. Thus both an easy and precise reproducibility and fully-automated control and/or servo control of the system is feasible by timing the geared motor. The rated value can be derived from the units of measurement of a layer-weight monitoring device.

What is claimed is:

1. In a device for the continuous application of a coating of constant thickness to a material web, being transported over a rotating mating roll of the type including an elastic coating knife having two edges, one of said edges being fixed in a clamping jaw and the other edge being free, said coating knife being initially in an unstressed condition, the fixed edge defining a fixing line in said clamping jaw and said free edge being parallel thereto, said free edge abutting said material web along a line defining an abutting line at a predetermined angle of incidence between said coating knife and said material web, the coating material being applied to said moving web such that the coating material passes between the free edge of said knife and said web for controlling the thickness of said coating material applied thereto, said coating knife being supported between said abutting line and said fixing line by support means along a line defining a supporting line, and said clamping jaw being pivotable about said abutting line and around an axis outside said fixing line for setting said predetermined angle of incidence, the improvement comprising:

means for moving said fixing line to impart to and vary the stress of said coating knife and thereby adjust the thickness of said coating material under continuous coating operating conditions and for maintaining the geometric configuration of said coating knife between said abutting line and said supporting line substantially fixed relative to said mating roll upon movement of said fixing line, said moving means including linear guidance means connected to said clamping jaw for shifting the clamping jaw and thereby said fixing line relative to said mating roll linearly along a plane defining an acute angle with respect to the plane of said unstressed coating knife whereby said angle of incidence is substantially unchanged upon varying of the stress of said coating knife.

2. A device according to claim 1, wherein said linear guidance means comprises a brace having therein a slot for slidably receiving said clamping jaw, said slot defining a linear path for movement of said clamping jaw relative to said mating roll and means for slidingly shifting said clamping jaw within said slot.

3. A device according to claim 2, wherein said shifting means comprises a spindle-type elevating mechanism coupled to said clamping jaw and a geared motor connected to said mechanism for activating said sliding movement of said clamping jaw.

4. A device according to claim 2, wherein said support means is arranged to support said coating knife substantially centrally between said abutting line and said fixing line.

5. A device according to claim 4, wherein said support means comprises a rigid comb ridge linearly contacting said coating knife.

6. A device according to claim 5, wherein said rigid comb ridge is seated in said brace and is adjustable therein for varying the support pressure along the supporting line by screw means.

* * * * *

UNITED STATES PATENT AND TRADEMARK OFFICE

CERTIFICATE OF CORRECTION

PATENT NO. : 4,220,113

DATED : September 2, 1980

INVENTOR(S) : Gerhard Wohlfeil

It is certified that error appears in the above-identified patent and that said Letters Patent are hereby corrected as shown below:

On the first page of the patent, please add the following:

Assignee: Jagenberg-Werke AG Dusseldorf, Fed. Rep. of Germany

Signed and Sealed this

*Eighteenth* Day of *November 1980*

[SEAL]

*Attest:*

SIDNEY A. DIAMOND

*Attesting Officer* — *Commissioner of Patents and Trademarks*